(12) United States Patent
Panabaker et al.

(10) Patent No.: US 7,523,269 B2
(45) Date of Patent: Apr. 21, 2009

(54) PREPARING MEMORY TO ALLOW ACCESS TO DATA WHEN PRIMARY OPERATING SYSTEM IS UNAVAILABLE

(75) Inventors: Ruston Panabaker, Bellevue, WA (US); Pasquale DeMaio, Bellevue, WA (US); William Jefferson Westerinen, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 643 days.

(21) Appl. No.: 11/187,208

(22) Filed: Jul. 22, 2005

(65) Prior Publication Data

US 2007/0022258 A1 Jan. 25, 2007

(51) Int. Cl.
G06F 12/00 (2006.01)

(52) U.S. Cl. ........................ 711/147; 711/154; 711/165; 711/170; 713/1; 713/2; 714/23

(58) Field of Classification Search ................. 711/147, 711/154, 165, 170; 714/23; 713/1, 2
See application file for complete search history.

(56) References Cited

U.S. PATENT DOCUMENTS

| | | | | |
|---|---|---|---|---|
| 5,715,464 | A * | 2/1998 | Crump et al. | 713/323 |
| 5,758,174 | A * | 5/1998 | Crump et al. | 713/323 |
| 5,765,198 | A | 6/1998 | McCrocklin et al. | 711/165 |
| 6,678,712 | B1 * | 1/2004 | McLaren et al. | 718/100 |
| 6,776,460 | B1 | 8/2004 | Lo | 301/58 |
| 6,795,912 | B1 * | 9/2004 | Itoh et al. | 713/2 |
| 7,356,677 | B1 * | 4/2008 | Rafizadeh | 713/1 |
| 2002/0068988 | A1 * | 6/2002 | Chan et al. | 700/94 |
| 2003/0088326 | A1 * | 5/2003 | Du et al. | 700/94 |
| 2004/0205396 | A1 | 10/2004 | Wu et al. | 714/23 |
| 2004/0225902 | A1 | 11/2004 | Cesare et al. | 713/300 |

(Continued)

FOREIGN PATENT DOCUMENTS

WO  WO 01/67243 A1  9/2001

OTHER PUBLICATIONS

Li, T. et al., "Routine Based OS-Aware Microprocessor Resource Adaptation for Run-Time Operating System Power Saving", *International Symposium on Low Power Electronics and Design, Proceedings of the 2003 International Symposium on Low Power Electronics and Design*, 2003, 241-246.

(Continued)

*Primary Examiner*—Stephen C Elmore
(74) *Attorney, Agent, or Firm*—Woodcock Washburn LLP

(57) ABSTRACT

Systems and methods of sharing files and data in memory between the two operating systems running on a computing device. A main operating system (OS) may execute on the computing device an provide numerous system features and functionality. To conserver power, the main OS may unload, or the computer may be reset, suspended or be shutdown. Prior to doing so, the main OS writes data to a known memory location that allows access by a secondary OS when the main OS is not present. The secondary OS provides a limited set of functionalities, while being able to use and interact with the data stored in the known memory location. Information about the data and permissions are stored in mailbox that is accessible to both operating system such that changes made when the secondary operating system is active are synchronized with the main operating system.

20 Claims, 4 Drawing Sheets

U.S. PATENT DOCUMENTS

2005/0182922 A1 * 8/2005 Guo et al. .................... 713/1

OTHER PUBLICATIONS

Lu, Y-H. et al., "Software Controlled Power Management", *Computer System Laboratory, Stanford University*, akebono.stanford.edu/users/nanni/research/dpm/codes99_paper.pdf, 5 pages.

Lu, Y-H. et al., "Low-Power Task Scheduling for Multiple Devices", *Computer System Laboratory, Stanford University*, akebono.stanford.edu/users/nanni/research/dpm/codes00.pdf, 5 pages.

"Real-Time OS:DSP/BIOS: MultiThreading Benefits", http://dspvillage.ti.com/docs/catalog/software/details.jhtml?templateId=5121&path, Sep. 9, 2005, 1 page.

* cited by examiner

PREPARING MEMORY TO ALLOW ACCESS TO DATA WHEN PRIMARY OPERATING SYSTEM IS UNAVAILABLE

FIELD OF THE INVENTION

The present invention generally relates to the field of computing devices. More particularly, the present invention relates a system for sharing data between two cooperating operating systems using known memory locations.

BACKGROUND OF THE INVENTION

In a conventional personal computer or media device, the main operating system and applications have access to storage, such as hard disk drives, system memory, etc. to enable playback of media, retrieval of e-mail, etc. However running the device in this mode uses a significant amount of power. In order to conserve power, conventional computers and media devices reduce power consumption by entering ACPI power states S3 or S4. However, when entering these states, the computer or media device is rendered unusable. User interaction is required to wake up these devices and bring it back to ACPI power state S0, which is the fully on power state, in order to resume use.

Other devices attempt to reduce power consumption by providing low power components (e.g., CPUs, hard drives, etc.). However these devices suffer from poor performance and use hardware components that are often not suitable for CPU-intensive tasks, such as video playback. Users are also frustrated because these devices fail to provide a significant reduction in power consumption over conventional devices when performing intensive tasks.

SUMMARY OF THE INVENTION

Systems and methods of sharing files and data in memory between the two operating systems running on a computing device. A main operating system (OS) may execute on the computing device an provide numerous system features and functionality. To conserver power, the main OS may unload, or the computer may be reset, suspended or be shutdown. Prior to doing so, the main OS writes data to a known memory location that allows access by a secondary OS when the main OS is not present. The secondary OS provides a limited set of functionalities, while being able to use and interact with the data stored in the known memory location. Information about the data and permissions are stored in mailbox that is accessible to both operating system such that changes made when the secondary operating system is active are synchronized with the main operating system.

For example, the main OS may copy calendar data and media files to memory then suspend or shutdown to conserve power. When in the suspended/shutdown mode a secondary processor (or second core in the main processor, or the main processor in a dual-boot configuration) and the secondary OS could access the data. Calendar data can be accessed to show calendar events on a display (either the main display or a secondary or auxiliary display) and media files could be played back while in a reduced power mode.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Exemplary Computing Environment

Figure 1:
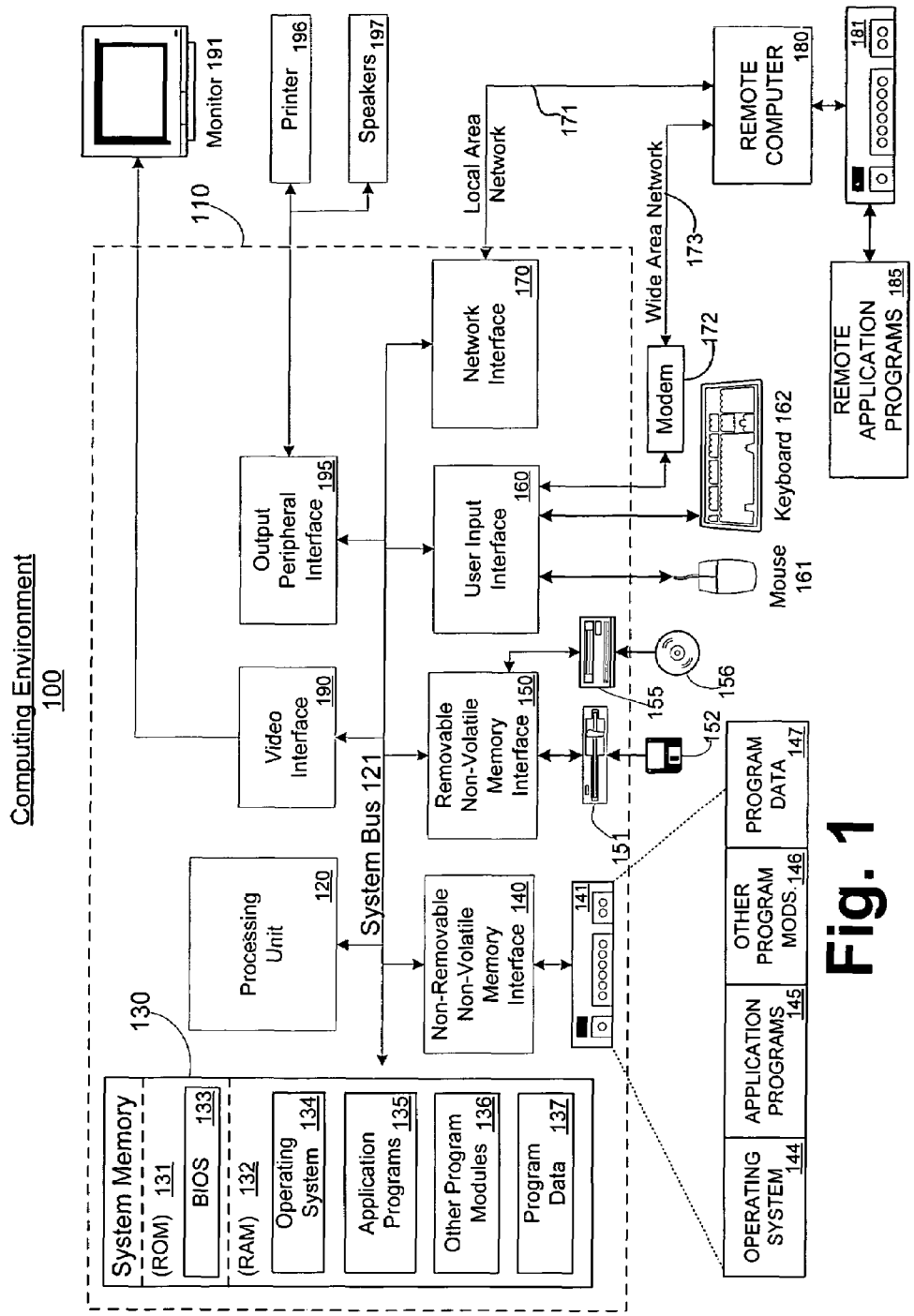
FIG. 1 is a block diagram showing an exemplary computing environment for implementing the invention.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Embodiments

To conserve power used by a computing device, it would be advantageous to run the computing device using a simpler, secondary operating system (OS) on a smaller processor, while turning off selected system devices. However, in such a mode system devices such the hard disk drive and network may not be active and the required software to support access to the data on these devices, such as digital rights management (DRM) or file system support may not be available. In these scenarios it would be beneficial if the main OS could write the needed data to a known memory location that allows access by the secondary OS when the main OS is not present.

For example, the main OS may copy calendar data and media files to memory then suspend to ACPI power state S3 or S4 or shutdown to ACPI power state S5. When in the suspended mode a secondary processor and the secondary OS could access the data. Calendar data can be accessed to show calendar events on a display (either the main display or a secondary or auxiliary display) and media files could be played back while in a reduced power mode.

Figure 2:
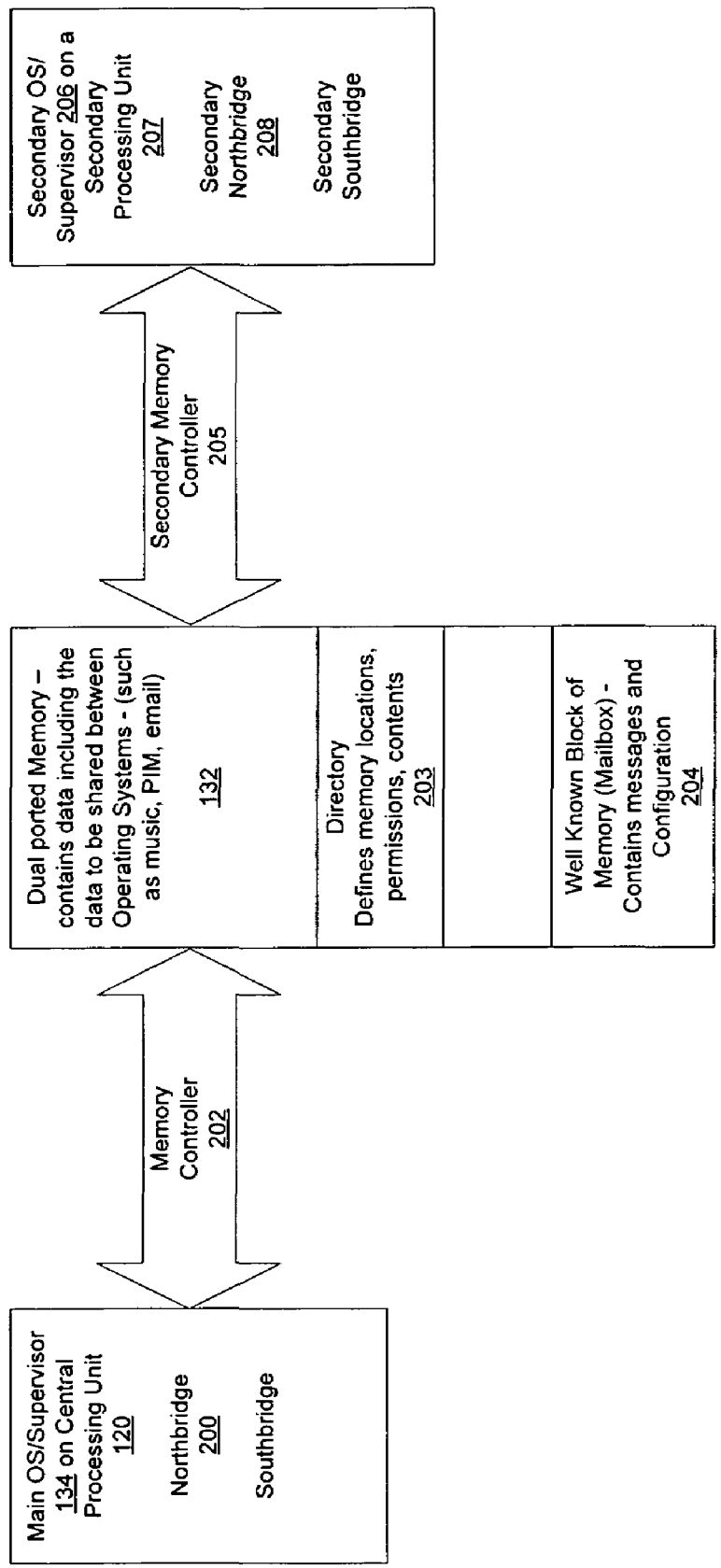
FIGS. 2-4 illustrate exemplary embodiments of the present invention.

FIG. 2 illustrates a first exemplary implementation of the present invention. In the implementation shown in FIG. 2, the main OS 134 running on the primary processor 120 stores data or a pointer to the data via its associate Northbridge 200 and memory controller 202 into in a well known location in memory 132. The memory 132 is preferably dual ported memory to enable a secondary OS 206 running on a secondary processor 207 to assess it via a secondary memory controller 205 and its own addressing scheme.

A directory 203 defines the memory locations into which the data is stored. A mailbox 204 provides a location where the main OS 134 and secondary OS 206 may communicate with each other. In addition, information such as permissions, configuration information, etc. may be contained in the mailbox 204. Further, interprocess communication (IPC) between the main and secondary operating systems may occur via the mailbox 204. A supervisor application runs on both the main operating system and secondary operating system to provide access to the mailbox 204, directory 203 and memory 132.

Thus, in accordance with the implementation of FIG. 2, the secondary OS runs on its own processor and accesses dual ported memory shared by the main OS and secondary OS via a secondary memory controller. This implementation may be useful where a computing device or media device is provided with auxiliary display having primitive navigation for, e.g., media playback, etc. The secondary OS provides for updating the auxiliary display and receiving navigation commands when the computing device/media device is in a standby or shutdown state (e.g., S3, S4 or S5).

For example, a user could load audio files, e-mail, etc. into memory and shutdown the main OS. Using the auxiliary display, the user could then read email and play music using the secondary OS. Any changes are saved in memory and noted in the mailbox. When the main OS is restarted, it accesses the mailbox to synchronize any changes made by the user.

Figure 3:
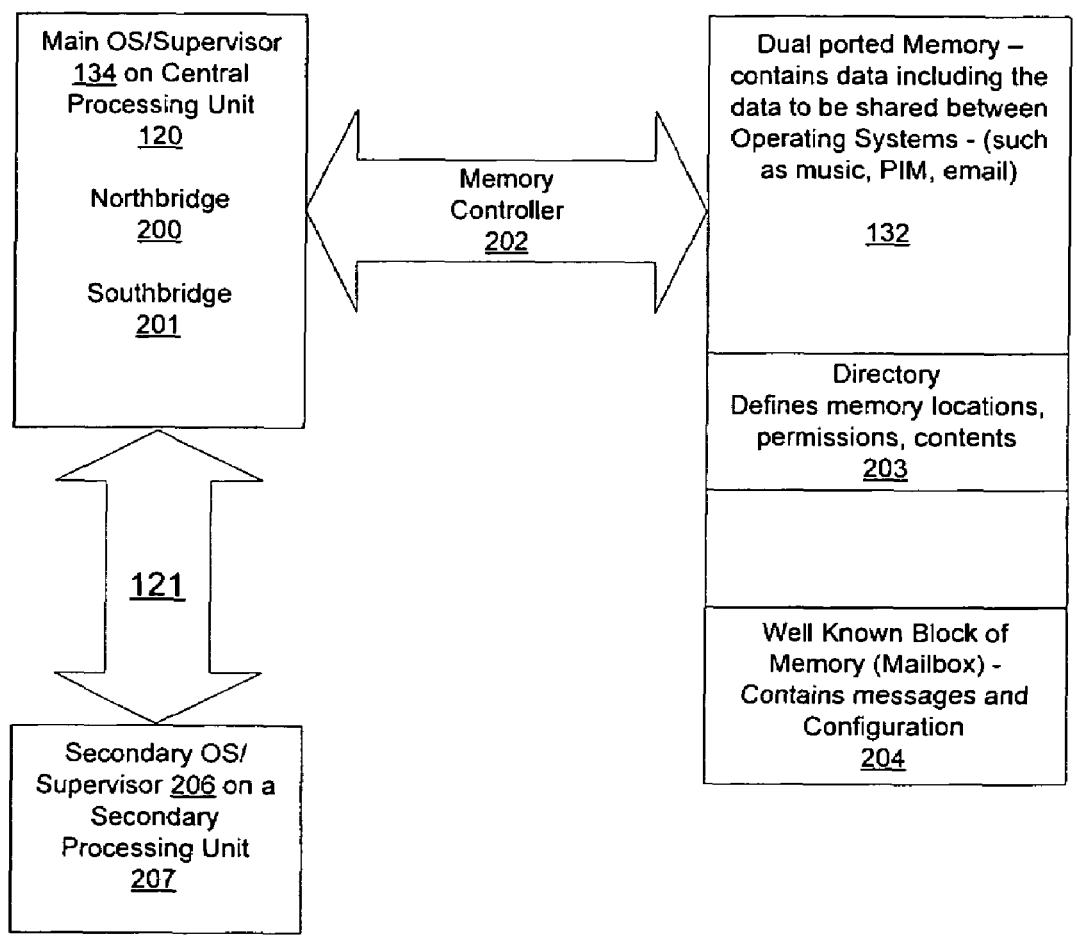

Referring now to FIG. 3, there is shown an implementation where the secondary OS 206 and secondary processor 207 are connected via the system bus 121 (e.g., PCIExpress) to a southbridge 201 associated with the main CPU 121 and main OS 134. Here, the memory 132 may be single ported memory that is accessed by both operating systems via the controller 202. The microprocessor 120 accesses memory directly through a memory manager (i.e., no DMA required). The microprocessor 207 would access the memory 132 by using a first party or third party DMA engine (located in the southbridge 201), which uses the system bus 121 to directly communicate with the memory controller 202. The microprocessor 207 is able to do this while the primary processor 120 and OS 134 are not in an operating state.

Alternatively, the CPU 120 may be a dual core CPU where each operating system runs on a separate core and accesses the controller 202. In this implementation there is no DMA required as the memory controller registers are set directly by the CPU over a bus that differs from the system bus 121. In this model the two cores may even share a common level 1 cache.

Figure 4:
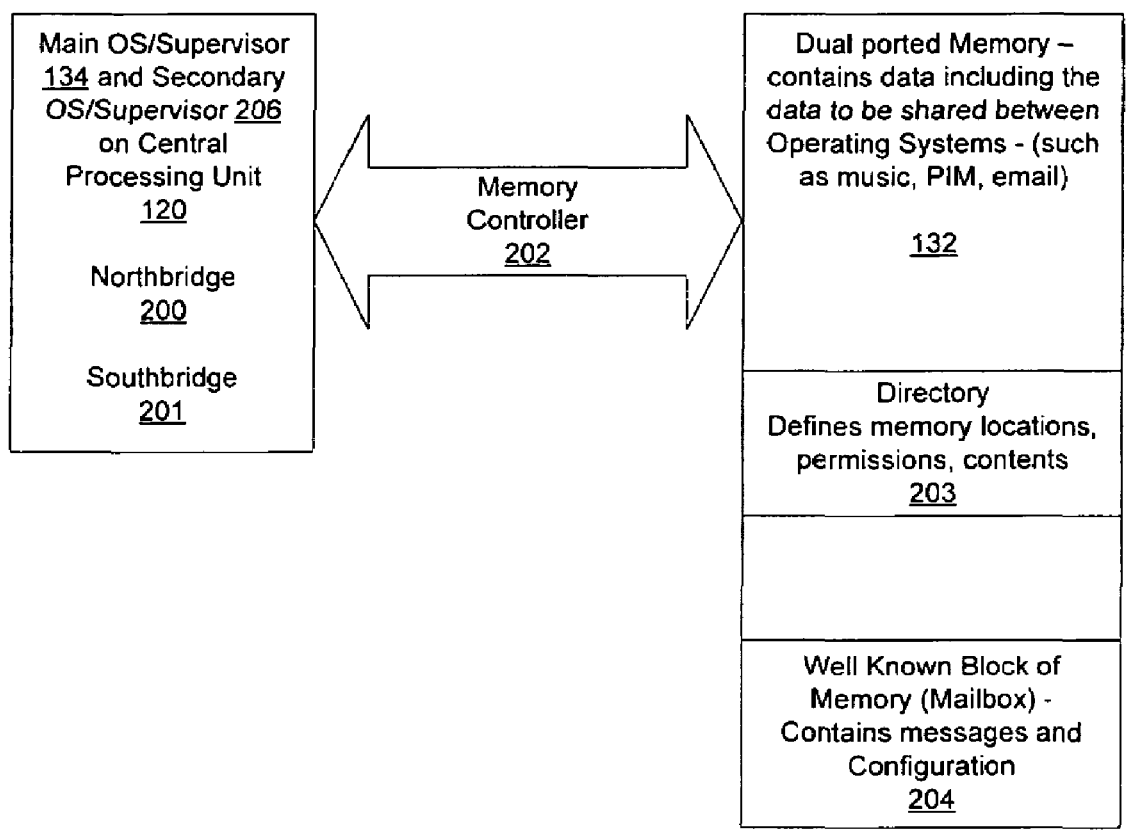

Referring now to FIG. 4, there is an implementation where both operating systems 134 and 206 run on the same CPU (e.g., 120). This would be a situation where the main OS 134 and secondary OS 206 are dual-booted and are able to share memory 132. For example, the main OS may hibernate (S4) and the secondary OS takes over on the processor 120. This implementation may be useful in, e.g., a notebook computer wherein the main OS can be placed into a hibernate state and the secondary OS may run to provide access to e-mail via a lightweight e-mail client and, optionally, an auxiliary display.

Thus, the present invention provides systems and methods of sharing files and data in memory between the two operating systems. The main OS may unload, or the computer may be reset, suspended or be shutdown depending on the implementation of the system. Thus, if the main memory remains powered across the system reset, data can maintained across a system reset. Alternatively, if non volatile memory is used or the memory remains powered when the system is shutdown, the data can maintained even on a shutdown and then a cold boot. This enables the system to be turned off while providing for data sharing.

While the present invention has been described in connection with the preferred embodiments of the various FIGS., it is to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method of sharing data between a first and second operating systems that run on a computing device, comprising:
    defining memory locations accessible by said first and second operating systems in a directory;
    providing a mailbox accessible by said first and second operating systems;
    placing data into said memory locations by said first operating system;
    removing said first operating system; and
    retrieving said data by said second operating system.

2. The method of claim 1, further comprising removing said first operating system by placing said computing device in one of a standby, hibernate and shutdown state.

3. The method of claim 1, further comprising:
    defining permissions and configuration information in said mailbox; and
    providing interprocess communication between said first and second operating systems via said mailbox.

4. The method of claim 3, further comprising providing a supervisor application that runs on said first and second operating systems to access said mailbox and said memory locations.

5. The method of claim 3, further comprising synchronizing changes made when said second operating system is active with said first operating system via said mailbox.

6. The method of claim 1, further comprising:
providing said first operating system on a first processor, said first operating system accessing said memory locations via a first memory controller; and
providing said second operation system on a second processor, said second operating system accessing said memory locations via a second memory controller.

7. The method of claim 1, further comprising:
providing said first operating system on a first processor, said first operating system accessing said memory locations via a system memory controller; and
providing said second operating system on a second processor communicatively connected to said system controller via a bus, said second operating system accessing said memory locations via said system memory controller.

8. The method of claim 1, further comprising:
providing said first operating system on first core in a system processor, said first operating system accessing said memory locations via a system memory controller; and
providing said second operating system on second core in said system processor, said second operating system accessing said memory locations via said system memory controller.

9. The method of claim 1, further comprising dual-booting said first and second operating systems on a system processor, said first and second operating systems accessing said memory locations via a system memory controller.

10. A computing device having a first and second operating systems that share data, comprising:
a first processor that runs said first operating system;
a second processor that runs said second operating system;
a mailbox accessible by said first and second operating systems; and
memory that is accessible by said first and second operating systems,
wherein data that is placed into said memory by said first operating system prior to said first operating system being removed is accessible to said second operating system when said first operating system is removed.

11. The computing device of claim 10, wherein a directory defines portions of said memory accessible by said first and second operating systems.

12. The computing device of claim 11, wherein the mailbox defines permissions and configuration information regarding said data.

13. The computing device of claim 12, wherein said first and second operating systems communicate via said mailbox.

14. The computing device of claim 13, wherein changes made by said second operating system are synchronized with said first operating system via said mailbox.

15. The computing device of claim 10, further comprising:
a first memory controller associated with said first processor; and
a second memory controller associated with said second processor,
wherein said first operating system accesses said memory via said first memory controller, and wherein said second operating system accesses said memory via said second memory controller.

16. The computing device of claim 10, further comprising:
a system memory controller; and
a bus,
wherein said second processor is communicatively connected to said system memory controller via said bus, and wherein said first and second operating systems access said memory via said system bus.

17. The computing device of claim 10, wherein said first processor comprises a first core on a system processor and wherein said second processor comprises a second core on said system processor.

18. A method of sharing data between a first and second operating systems that run independently and at different times on a computing device, comprising:
providing a directory of memory locations where said data to be shared is located;
providing a mailbox where said first and second operating systems communicate information related to said data; and
synchronizing changes made to said data by said second operating system to said first operating system via said mailbox when said first operating system is executed after said second operating system has finished execution.

19. The method of claim 18, further comprising providing a subset of functionalities of said computing device when said second operating system is executing as compared to when said first operating system is executing.

20. The method of claim 19, further comprising reducing power consumption of said computing device when said second operating system is executing as compared to when said first operating system is running.

* * * * *